(12) United States Patent
Xia

(10) Patent No.: US 12,366,660 B2
(45) Date of Patent: Jul. 22, 2025

(54) SYSTEM AND METHOD FOR DETECTING ROAD INTERSECTION ON POINT CLOUD HEIGHT MAP

(71) Applicant: Beijing Jingdong Qianshi Technology Co., Ltd., Beijing (CN)

(72) Inventor: Yin Xia, Mountain View, CA (US)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 827 days.

(21) Appl. No.: 17/675,029

(22) Filed: Feb. 18, 2022

(65) Prior Publication Data

US 2023/0266469 A1   Aug. 24, 2023

(51) Int. Cl.
| | | |
|---|---|---|
| *G01S 17/89* | (2020.01) | |
| *G06T 7/521* | (2017.01) | |
| *G06V 10/25* | (2022.01) | |
| *G06V 20/56* | (2022.01) | |

(52) U.S. Cl.
CPC .............. *G01S 17/89* (2013.01); *G06T 7/521* (2017.01); *G06V 10/25* (2022.01); *G06V 20/588* (2022.01); *G06T 2207/10028* (2013.01)

(58) Field of Classification Search
CPC ........ G01S 17/89; G01S 7/4802; G01S 17/86; G01S 7/4808; G06T 7/521; G06T 2207/10028; G06V 10/25; G06V 20/588; G06V 10/762; G06V 10/758; G06V 20/64
See application file for complete search history.

(56) References Cited

U.S. PATENT DOCUMENTS

| | | | |
|---|---|---|---|
| 10,012,997 B2 | 7/2018 | Ben Shalom et al. | |
| 10,899,345 B1 | 1/2021 | Ferguson et al. | |
| 2018/0158217 A1* | 6/2018 | Wang | ................... G06T 11/006 |
| 2020/0357160 A1* | 11/2020 | Kulkarni | ................. G01S 17/58 |
| 2021/0270958 A1* | 9/2021 | Fang | ....................... G01S 17/89 |
| 2023/0186494 A1* | 6/2023 | Bosse | .................... G06V 20/56 |
| | | | 345/424 |

OTHER PUBLICATIONS

Michael Scott Kerdziel, A monocular color vision system for road intersection detection, Rochester Institute of Technology Theses, 2008.
Yao-Yi Chiang and Craig A. Knoblock, Automatic extraction of road intersection position, connectivity, and orientations from Raster maps, ACM GIS'08, Nov. 5-7, 2008.

(Continued)

*Primary Examiner* — Thomas Ingram
(74) *Attorney, Agent, or Firm* — Scully, Scott, Murphy & Presser, P.C.

(57) ABSTRACT

A system and method for autonomous navigation. The system includes a computing device having a processor and a storage device storing computer executable code. The computer executable code, when executed at the processor, is configured to: provide a three dimensional (3D) point cloud; generate a two dimensional (2D) height map of the 3D point cloud in a region of interest; generate normalized ray length histogram from the height map for each ground pixel; determine an intersection based on the normalized ray length histogram; and determine an intersection of the region of interest based on the number of ground pixels having a type of intersection.

20 Claims, 6 Drawing Sheets

(56) References Cited

OTHER PUBLICATIONS

Alireza Fathi and John Krumm, Detecting road intersections from GPS traces, GIScience 2010, Sixth International Conference on Geographic Information Science, Zurich, Sep. 14-17, 2010.
Yihuan Zhang, Jun Wang, Xiaonian Wang, Chaocheng Li, and Liang Wang, 3D LIDAR-based intersection recognition and road boundary detection method for unmanned ground vehicle, 2015 IEEE 18th International Conference on Intelligent Transportation Systems, 2015.

* cited by examiner

SYSTEM AND METHOD FOR DETECTING ROAD INTERSECTION ON POINT CLOUD HEIGHT MAP

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to the field of mapping and autonomous vehicle navigation, and more particularly to systems and methods for detecting intersections based on point cloud height map.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In high resolution mapping or autonomous navigation, a global path is generally provided, which includes routes, intersections on the route, and turning directions at each intersection. Accurate detection of the intersections helps recognition of traffic signs and marked crosswalks, such that the autonomous vehicle can have efficient path planning and make correct driving decisions.

Existing methods for detecting intersections could be categorized in three approaches: red-green-blue (RGB) image based method, geographic information system (GIS) trajectory based methods, and light detection and ranging (LIDAR) based method. RGB image includes both images captured by cameras mounted on the car and aerial images capture by drones or satellites. An example of the RGB image based method, with images captured from a camera on the car is "a monocular color vision system for road intersection detection" by Michael Scott Kurdziel, 2008. An example of the RGB aerial image based method is "automatic extraction of road intersection position, connectivity, and orientations from raster maps" by Yao-Yi Chiang, et al., 2008. An example of the GIS trajectory based method is "detecting road intersections from GPS traces" by Alireza Fathi, et al., 2010. An example of the LIDAR based method is "3D LIDAR-based intersection recognition and road boundary detection method for unmanned ground vehicle" by Yihuan Zhang, et al., 2015, where point cloud and trajectory are used.

The RGB image based methods share the limitation of light condition. Illumination can change dramatically from different weather and environment. Also, the shading caused by trees and buildings will challenge the performance of estimating the road intersection patterns. The trajectory based methods rely on large amount of car trajectory data in order to make sure all intersections are covered. In the case of single car driving through each street only once, it can be very challenging because noise in the trajectory, such as change of lane and U-turn, can incur false detection of intersections.

Therefore, an unaddressed need exists in the art to address the aforementioned deficiencies and inadequacies.

SUMMARY

In certain aspects, the present disclosure provide a LIDAR based method for intersection detection. Compare with RGB or GIS based methods, LIDAR data is less sensitive to weather and lighting, and also usually dense enough to encode local 3D environment with only single drive through the streets. Further, the method of the present disclosure does not purely rely on the raw LIDAR point cloud. Instead, the present disclosure processes the point cloud local statistics and generate new data format as our input data for road intersection detection. In certain embodiments, the present disclosure computes the local point cloud height and generate a 2D raster map.

In certain aspects, the present disclosure relates to a system for autonomous navigation. In certain embodiments, the system includes a computing device, and the computing device has a processor and a storage device storing computer executable code. The computer executable code, when executed at the processor, is configured to:

provide a three dimensional (3D) point cloud;
generate a two dimensional (2D) height map of the 3D point cloud in a region of interest, wherein each pixel on the 2D height map has a height value corresponding to its height in the 3D point cloud;
estimate whether a 2D pixel in the 2D height map is a ground pixel;
for each ground pixel, draw a plurality of ray lines from the ground pixel toward edges of the 2D height map until the ray lines intersect with a nonground pixel or one of the edges, and calculate a normalized ray length for each of the ray lines, where each of the normalized ray lengths is a ratio between a length of each of the ray lines and a length of a corresponding extended ray line, and the corresponding extended ray line is the extension of the ray line until it intersects one of the edges; and
recognize a type of intersection of the region of interest based on the normalized ray lengths.

In certain embodiments, the computer executable code is configured to recognize the intersection by: predicting the type of intersection for each of the ground pixels; and determining the type of intersection of the region of interest according to the predicted type of intersections for all the ground pixels. The type of intersection of the region of interest comprises a four way intersection, a three way intersection, and an open road.

In certain embodiments, the step of predicting the type of intersection for each of the ground pixels includes: forming a histogram comprising all of the normalized ray lengths, wherein horizontal axis of the histogram is angles of the normalized ray lengths, and vertical axis of the histogram is values of the normalized ray lengths; determining a group of the normalized ray lengths having a value of 1 neighbored by one of the normalized ray lengths less than 1 at both sides; and deciding the type of intersections corresponding to the ground pixel as the four way intersection, the three way intersection or the straight street when a number of groups is four, three and two, respectively.

In certain embodiments, the step of determining the type of intersection according to the predicted type of intersections for all the ground pixels includes: ranking the types of intersections based on a number of ground pixels predicted to be the types of intersections; and determining the intersection in the region of interest to be the type of intersections that have a top rank.

In certain embodiments, the 3D point cloud is constructed using LIDAR signals. In certain embodiments, the 3D point cloud is constructed using SLAM.

In certain embodiments, a size of the region of interest is 50 meters×20 meters. In certain embodiments, each pixel in the 2D height map covers a 3 cm-5 cm×3 cm-5 cm area of the regions of interest, and averaged height of points in the 3D point cloud above the area is defined as height of the pixel. In certain embodiments, a height for each of the ground pixel is less than a threshold value in a range of −30 centimeters to 30 centimeters.

In certain embodiments, a ground of the 2D height map is determined by: defining a plurality of patches in the 2D height map, each patch containing a plurality of pixels; calculating a height for each of the patches as an average height of the pixels in the patch; clustering the patches having the height equals to or less than 30 cm as ground patches; calculate a ground plane using the ground patches; and defining the ground plane as the true ground of the 2D height map when the ground patches fits the ground plane.

In certain aspects, the present disclosure relates to a method for autonomous navigation. In certain embodiments, the method includes:
  providing, by a computing device, e a three dimensional (3D) point cloud;
  generating, by the computing device, a two dimensional (2D) height map of the 3D point cloud in a region of interest, wherein each pixel on the 2D height map has a height value corresponding to its height in the 3D point cloud;
  estimating, by the computing device, whether a 2D pixel in the 2D height map is a ground pixel;
  for each ground pixel: drawing a plurality of ray lines from the ground pixel toward edges of the 2D height map until the ray lines intersect with a nonground pixel or one of the edges, and calculating a normalized ray length for each of the ray lines, wherein each of the normalized ray lengths is a ratio between a length of each of the ray lines and a length of a corresponding extended ray line, and the corresponding extended ray line is the extension of the ray line until it intersects one of the edges; and
  recognizing, by the computing device, a type of intersection of the region of interest based on the normalized ray lengths In certain embodiments, the step of recognizing the type of intersection of the region of interest includes: predicting the type of intersection for each of the ground pixels; and determining the type of intersection of the region of interest according to the predicted type of intersections for all the ground pixels. The type of intersection of the region of interest comprises a four way intersection, a three way intersection, and an open road.

In certain embodiments, the step of predicting the type of intersection for each of the ground pixels includes: forming a histogram comprising all of the normalized ray lengths, wherein horizontal axis of the histogram is angles of the normalized ray lengths, and vertical axis of the histogram is values of the normalized ray lengths; determining a group of the normalized ray lengths having a value of 1 neighbored by one of the normalized ray lengths less than 1 at both sides; and deciding the type of intersections corresponding to the ground pixel as the four way intersection, the three way intersection or the straight street when a number of groups is four, three and two, respectively.

In certain embodiments, the step of determining the type of intersection according to the predicted type of intersections for all the ground pixels includes: ranking the types of intersections based on a number of ground pixels predicted to be the types of intersections; and determining the intersection in the region of interest to be the type of intersections that have a top rank.

In certain embodiments, the 3D point cloud is constructed using LIDAR signals, and the 3D point cloud is constructed using SLAM.

In certain embodiments, a size of the region of interest is 50 meters×20 meters, each pixel in the 2D height map covers a 3 cm-5 cm×3 cm-5 cm area of the regions of interest, and averaged height of points in the 3D point cloud above the area is defined as height of the pixel.

In certain embodiments, a height for each of the ground pixel is less than a threshold value in a range of −30 cm to 30 cm.

In certain embodiments, the method further includes determining a ground of the 2D height map by: defining a plurality of patches in the 2D height map, each patch containing a plurality of pixels; calculating a height for each of the patches as an average height of the pixels in the patch; clustering the patches having the height equals to or less than 30 cm as ground patches; calculating a ground plane using the ground patches; and defining the ground plane as the true ground of the 2D height map when the ground patches fits the ground plane.

In certain embodiments, the present disclosure relates to a method for completing a map, where an original map and 3D point cloud of the original map is provided. The method includes: providing, by a computing device, e a three dimensional (3D) point cloud; generating, by the computing device, a two dimensional (2D) height map of the 3D point cloud in a region of interest, wherein each pixel on the 2D height map has a height value corresponding to its height in the 3D point cloud; estimating, by the computing device, whether a 2D pixel in the 2D height map is a ground pixel; for each ground pixel: drawing a plurality of ray lines from the ground pixel toward edges of the 2D height map until the ray lines intersect with a nonground pixel or one of the edges, and calculating a normalized ray length for each of the ray lines, wherein each of the normalized ray lengths is a ratio between a length of each of the ray lines and a length of a corresponding extended ray line, and the corresponding extended ray line is the extension of the ray line until it intersects one of the edges; and recognizing, by the computing device, a type of intersection of the region of interest based on the normalized ray lengths.

In certain aspects, the present disclosure relates to a non-transitory computer readable medium storing computer executable code. In certain embodiments, the computer executable code, when executed at a processor of a computing device, is configured to perform the method described above.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
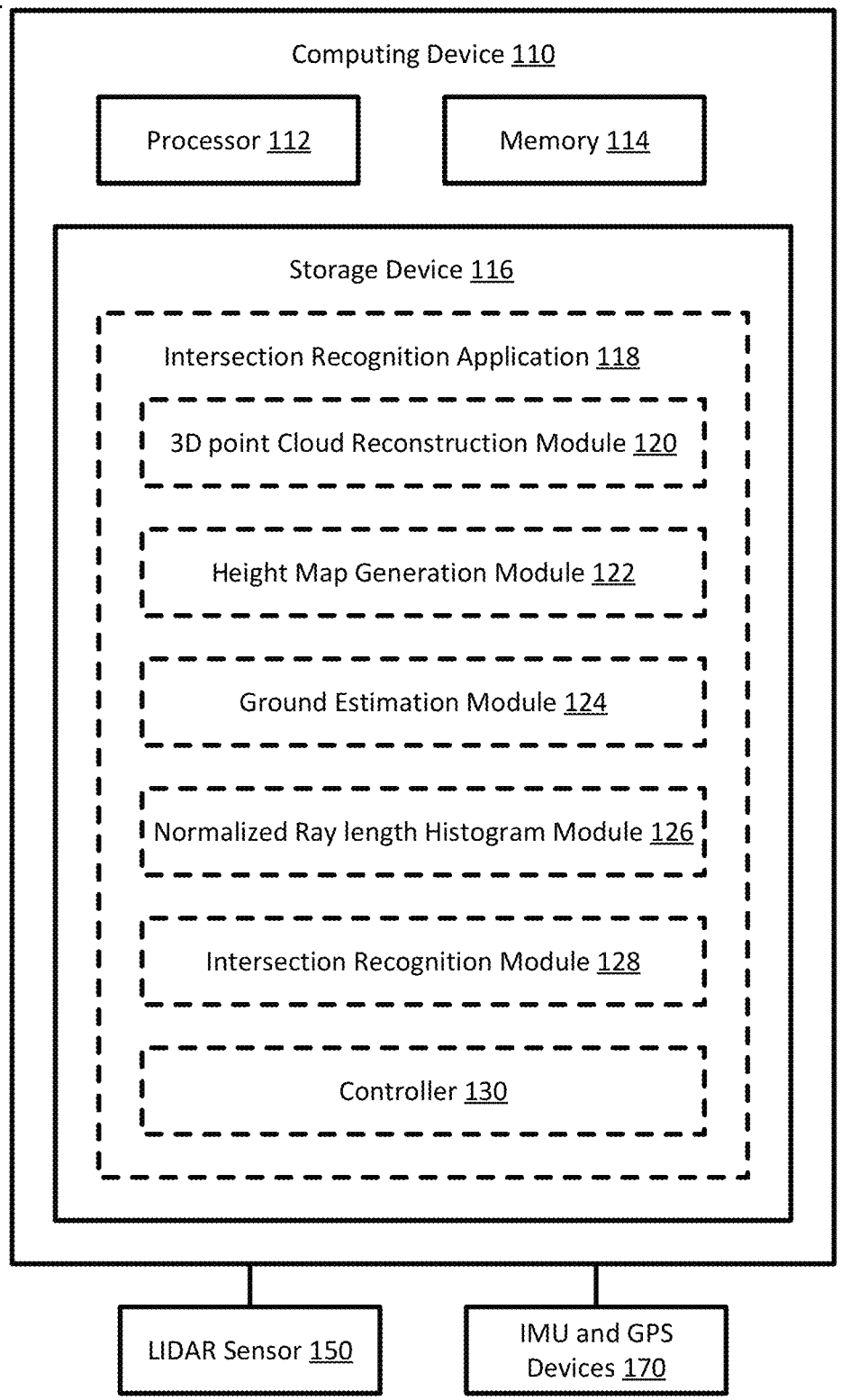
FIG. 1 schematically depicts a system for autonomous navigation according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Road intersection is a complex scene where pedestrians and cars move in various directions and orders. For autonomous driving car to drive safely, complex rules need to be encoded in such areas in a high-resolution map, such as correspondence between traffic lights and moving directions. Therefore, detection of the road intersection regions is a prerequisite for encoding the rules. A road intersection has various forms such as an intersection between car lanes, an intersection between a car lane and a local community. As a result, the number and shapes of road intersection might vary a lot. Manually annotating thousands of such intersection regions in the map is labor intensive. To increase the map production efficiency, automatic road intersection detection is essential to reduce time and cost for high-resolution map production.

In certain aspects, the present disclosure relates to a system for completing a map. In certain embodiments, the system includes a computing device. The computing device is provided with high-resolution map data, and is aimed to automatically detect road intersections directly from the high-resolution map data so as to complete the map labeled with intersections. In certain embodiments, the high-resolution map data may be LIDAR data collected by cars driving in the mapped area.

In certain aspects, the present disclosure relates to a system for autonomous navigation. In certain embodiments, the system includes a computing device and a LIDAR device installed on an autonomous vehicle. The LIDAR device is configured to collect real-time LIDAR signals, and the computing device is configured to automatically detect road intersections and use the detected road intersections for autonomous driving.

Both the autonomous road intersection detection for high-resolution map data and the autonomous road intersection detection for real-time autonomous driving can be essentially implemented by the description relative to the following FIG. 1, although certain variations may be needed.

FIG. 1 schematically depicts a system for autonomous navigation according to certain embodiments of the present disclosure. As shown in FIG. 1, the system 100 includes a computing device 110, a LIDAR sensor 150, and inertial measurement unit (IMU) and global positioning system (GPS) devices 170. The system 100 may be installed on an autonomous vehicle. In certain embodiments, the computing device 110 shown in FIG. 1 may be a server computer, a cluster, a cloud computer, a general-purpose computer, a headless computer, or a specialized computer, which provides navigation service. In certain embodiments, the computing device 110 is a specialized computer or an embedded system which have limited computing power and resources. LIDAR is an acronym of "light detection and ranging" or "laser imaging, detection, and ranging," and the LIDAR sensor 150 is configured to determine ranges by targeting an object with a laser and measuring the time for the reflected light to return to the receiver. The IMU and GPS devices 170 are configured to measure the position and orientation of the autonomous vehicle. In certain embodiments, when the system 100 is used for map completion, there is no need to include the LIDAR sensor 150 and the IMU and GPS devices 170. Under this situation, the 3D point cloud in the 3D world is provided by other means and is part of the original map, and the system is configured to detect intersections in the original map based on the provided 3D point cloud.

The computing device 110 may include, without being limited to, a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices. The processor 112 may be a central processing unit (CPU) which is configured to control operation of the computing device 110. In certain embodiments, the processor 112 can execute an operating system (OS) or other applications of the computing device 110. In certain embodiments, the computing device 110 may have more than one CPU as the processor, such as two CPUs, four CPUs, eight CPUs, or any suitable number of CPUs. The memory 114 may be a volatile memory, such as the random-access memory (RAM), for storing the data and information during the operation of the computing device 110. In certain embodiments, the memory 114 may be a volatile memory array. In certain embodiments, the robotic device 110 may run on more than one processor 112 and/or more than one memory 114. The storage device 116 is a non-volatile data storage media or device. Examples of the storage device 116 may include flash memory, memory cards, USB drives, or other types of non-volatile storage devices such as hard drives, floppy disks, optical drives, or any other types of data storage devices. In certain embodiments, the computing device 110 may have more than one storage device 116. In certain embodiments, the computing device 110 may also include a remote storage device 116.

The storage device 116 stores computer executable code. The computer executable code includes an intersection recognition application 118. The intersection recognition application 118 includes the code or instructions which, when executed at the processor 112, may perform autonomous navigation following a planned path. In certain embodiments, as shown in FIG. 1, the intersection recognition application 118 includes, among other things, a three dimensional (3D) point cloud reconstruction module 120, a height map generation module 122, a ground estimation module 124, a normalized ray length histogram module 126, an intersection recognition module 128, and a controller 130.

The 3D point cloud reconstruction module 120 is configured to, upon receiving LIDAR signals (point cloud in the LIDAR sensor coordinate system) at different times and locations and the position/orientation of the autonomous vehicle, transform the 3D point cloud in the LIDAR sensor coordinate system into a uniform geographic coordinate system (preferably 3D world coordinate system) to forma a 3D point cloud in the 3D world coordinate system, and send the 3D point cloud to the height map generation module 122. The LIDAR signals includes the points detected by the LIDAR sensor 150, each point may have a timestamp, a distance to the LIDAR sensor 150, and a pose of the LIDAR sensor 150. In certain embodiments, the pose of the LIDAR sensor 150 is recorded or derived from the data collected by the IMU and GPS device 170.

In certain embodiments, there may be LIDAR signals from multiple LIDAR sensors 150 installed on multiple autonomous vehicles, and each LIDAR signal is coupled with a timestamp and a pose of the corresponding LIDAR sensor. The 3D point cloud reconstruction module 120 is configured to accumulate the signals from the same LIDAR sensor at different times (different frames), to obtain 3D coordinates of the points collected by the LIDAR sensor, and then reconstruct the 3D point cloud by stitching the 3D coordinates of the points from different LIDAR sensors. Thus, the process includes adjustment of the coordinates of the points based on the positions of the matched points from different LIDAR sensors, and includes adjustment of the poses of the LIDAR sensors.

In certain embodiments, there may be only one LIDAR sensor 150, and the LIDAR signals from the same LIDAR sensor at different times can also be used to reconstruct the 3D point cloud. In other words, the function of the 3D point cloud reconstruction module 120 is a point cloud registration process, which transfers 3D point cloud points in each time and location to the uniform geographic coordinate system, such as the 3D world coordinate system. In certain embodiments, the 3D point cloud reconstruction is performed by simultaneous localization and mapping (SLAM). In certain embodiments, the 3D point cloud reconstruction module 120 is configured to update the 3D point cloud at a predetermined interval. In certain embodiments, the predetermined interval is in a range of 10-100 meters. In certain embodiments, the predetermined interval is 20 meters, in other words, the system 100 updates the 3D point cloud whenever the autonomous vehicle moves for 20 meters.

The height map generation module 122 is configured to, upon receiving the 3D point cloud, select a region of interest from the map area. In certain embodiments, when the system is used for map completion, the 3D point cloud covers 3D scene of a city-scale range of area, many regions of interest are defined, and each of the regions of interest is processed to obtain its corresponding height map. Each region of interest may be formed, along the driving direction of one of the automobiles, and in front of the automobile. In an example, the height map generation module 122 defines regions of interest at a 20-meter interval along the driving direction, and one region of interest may be a 50 meter×20 meter rectangular area in front of the automobile. In the example, the 50 meter is the length along the driving direction, and the 20 meter is the width substantially perpendicular to the driving direction. In certain embodiments, the size of the region of interest is in a range of 10-100 meters×4-40 meters.

After the region of interest is defined, the height map generation module 122 is further configured to define a flat surface as a ground surface. The ground defined at this stage is coarse. In certain embodiments, the coarse ground is derived based on the height of the LIDAR sensor 150 installed on the automobile, where a height of 0 (such as the bottom of the tires of the automobile) is defined as the coarse ground. In certain embodiments, the points in the 3D point cloud that have substantially the lowest values, and are substantially on the same level, form the coarse ground. For example, the points in the 3D point clouds have different heights, if 2% of the points have a height less than 0, 50% of the points have a height of 0-3 cm, 5% of the points have a height of 3-20 cm, and 43% of the points have a height of 20 cm or higher, then the height map generation module 122 would define the 50% of the points having a height of 0-3 cm to be the coarse ground. In certain embodiments, the coarse ground is defined for the region of interest. In certain embodiments, the coarse ground is defined for all the map area covered by the 3D point cloud.

The height map generation module 122 is further configured to, after defining the coarse ground, project the points in the 3D point cloud to the coarse ground to obtain the projected height map. In certain embodiments, the projection is performed only on the 3D points that are directly above the region of interest. In certain embodiments, the height map generation module 122 may first define pixels for the projected height map in the region of interest. For example, each pixel of the projected height map may correspond to a 3 cm×3 cm or a 5 cm×5 cm 2D patch on the coarse ground, each point of the 3D point cloud that is directly above the patch has a height, and the average height of the points above the patch is used as the height of the pixel of the height map. In certain embodiments, if a patch does not have corresponding 3D points, the height map generation module 122 may give a default height value to the pixel corresponding to the patch, where the default value can be a great value such as 5 meters. In certain embodiments, any height value higher than 5 meters is assigned with the default height value. In certain embodiments, the size of the patch is in a range of 1 cm×1 cm to 20 cm×20 cm. In certain embodiments, the default height value is in a range of 0.5 meter to 20 meters.

In certain embodiments, the height map generation module 122 is further configured to filter noise in the projected height map to form a filtered height map. In certain embodiments, the filtering is performed using median filter or Gaussian filter. In certain embodiments, the height map generation module 122 is further configured to smooth the filtered height map to form a final height map, and send the final height map to the ground estimation module 124. Therefore, the final height map sent to the ground estimation module 124 could be the projected height map, the filtered height map, and the filtered and smoothed height map. The generated 2D height map is a top-down view or bird-eye view of the 3D point cloud data in the region of interest, and each pixel of the height map encodes a height value (z value).

By choosing the patch as the pixel of the height map, the disclosure not only increases the processing speed, but also reduces noises. The noises in the map can be further reduced by the filtering.

The ground estimation module 124 is configured to, upon receiving the height map from the height map generation module 122, estimate ground from the height map, and send the height map having the estimated ground to the normalized ray length histogram module 126.

As discussed above, a coarse ground is defined during the generation of the height map, and the height of the pixels in the height map is relative to the coarse ground. To estimate the ground more accurately, the ground estimation module 124 is configured to refine the coarse ground. At the beginning of the ground refining process, the ground estimation module 124 is configured to define a patch in the height map, where each patch corresponds to, for example, a small area in the height map containing multiple pixels. In certain embodiments, the size of each patch is about 2-10 pixels× 2-10 pixels. In certain embodiments, the size of each patch is 3 pixel×3 pixel. In certain embodiments, the size of each patch is 5 pixel×5 pixel.

After defining the patches, the ground estimation module 124 is further configured calculate the height of each patch by averaging the height of all the pixels in the patch. For example, when the patch is the 5 pixel×5 pixel patch, the height of the patch is the average height of the 25 pixels in the patch.

When the height of a patch equals to or is less than a threshold height of the ground, the ground estimation module 124 is configured to label the patch as a ground patch. In certain embodiments, the threshold height of the ground is set at about 3-50 centimeters (cm). In certain embodiments, the threshold height of the ground is set at 30 cm. For the patches having a height of more than the threshold height of the ground, the ground estimation module 124 is configured to label the patch as a nonground patch. However, when the eight patches surrounding a center patch are ground patches, even if the center patch has a height more than the threshold height, the ground estimation module 124 is configured to label the center patch as a ground patch. [How do you use the comparison between a patch and its 8 surrounding patches to classify ground or nonground patches? What is the relationship between the comparison criteria and the 30 cm criteria?]

After labeling the ground patches, the ground estimation module 124 is further configured to fit the ground patches to an equation of a plane. In certain embodiments, the plane is defined by ax+by+cz+d=0, where x, y and z are 3D world coordinates, and a, b, c, and d are constant parameters. In certain embodiments, if the fit error of the ground patches to the plane is large, such as greater than 10, then the plane is set as a hypothetical ground, the patches having a height within the threshold height (for example, 30 cm) to the hypothetical ground are reassigned with the label ground, and the ground patches are used to recalculate a ground plane. If the fit error is small, such as less than 10, then the plane is defined as the real ground, the patches having a height within 30 cm to the real ground are classified as ground patches and are given a height of its actual height (or in certain embodiments given a height of zero), and the patches having a height over 30 cm to the real ground are classified as nonground patches, and are given a height of 255 (here the height of the patches are normalized to a range of 0-255). In certain embodiments, in order to determine whether the hypothetical ground plane is the real ground, the ground estimation module 124 is further configured to determine the number of patches that change labels using the previous ground plane and the current ground plane. In certain embodiments, the ground plane will be optimized to a local optimum. In certain embodiments, the ground plane is determined to be the local optimum when the number of changed labels is less than a predetermined number or a predetermined percentage. The changed labels means that after a round of ground plane optimization, the label of a patch changes from a ground patch to a nonground patch, or changes from a nonground patch to a ground patch. The predetermined number can be in a range of 10-500 patches, for example 100 patches. The predetermined percentage can be in a range of 0.1%-5%, for example 1%. In certain embodiments, both the fit error standard and the patch label changing standard are used to evaluate whether the ground plane is the real ground plane. In certain embodiments, only one of the above two standards is used for determining the real ground plane. When the current ground plane is not good, the ground estimation module 124 is configured to reassign ground and nonground labels to the patches using the current plane (for example, assigning patches within 30 cm to the current plane as ground patches), and calculate a new plane using the newly assigned ground patches. The process is iteratively performed until the criteria of a good fit is met, and the plane met the requirement is regarded as the true ground plane. The ground estimation module 124 is further configured to normalize the height of the patches relative to the true ground plane to a range of 0-255, so as to form normalized height map. As the result, after ground plane estimation, the normalized height map includes patches, each patch has its x, y coordinates in the 2D height map, and is labeled as a ground patch having its actual height, or is labeled as a nonground patch having a height of 255.

Figure 2:
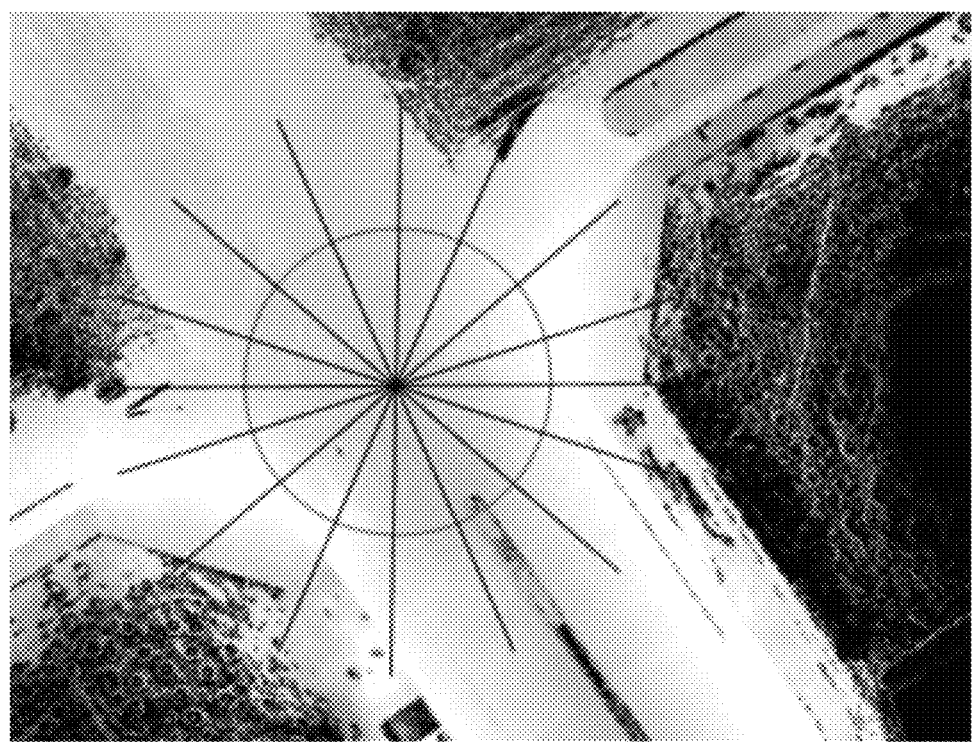
FIG. 2 schematically depicts rays from a pixel or patch on a height map according to certain embodiments of the present disclosure.
Figure 3:
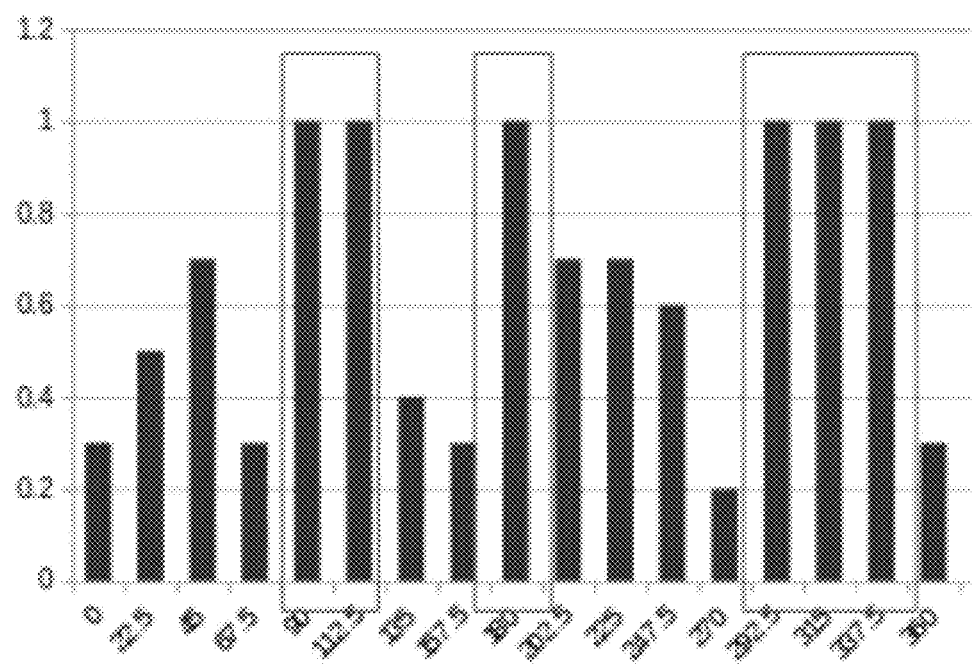
FIG. 3 schematically depicts a normalized ray length histogram according to certain embodiments of the present disclosure.

The normalized ray length histogram module 126 is configured to, upon receiving the normalized height map from the ground estimation module 124, construct normalized ray length histogram, and send the normalized ray length histogram to the intersection recognition module 128. FIG. 2 and FIG. 3 schematically depicts generation of the normalized ray length histogram according to certain embodiments of the present disclosure. As shown in FIG. 2, the normalized ray length histogram module 126 is configured to, in the normalized height map, draw a predetermined number of rays starting from a location of the vehicle [please confirm if we form a normalized ray length histogram for each pixel, or for each patch, or for each location of the vehicle]. In certain embodiments, the predetermined number is in a range of 8-36. In certain embodiments, the predetermined number is in a range of 12-24. In certain embodiments, the predetermined number is 16, and thus two neighboring rays forms an acute angle of 22.5 degrees. As shown in FIG. 2, there are 16 rays from the location of the vehicle. For each ray, it reaches out from the center location, and stops at the normalized height map pixel that has a height of 255. The line segment from the center to the stopping pixel has a length of $d_s$. If the ray continues to extend until the edge of the height image, the line segment from the center to the edge of the height image has a length of $d_e$. The value of $d_s/d_e$ is defined as the normalized ray length. In certain embodiments, several rays are defined in each 22.5 degrees of an arc, and the average of the $d_s/d_e$ of the rays are defined as the normalized ray length. After obtaining the normalized ray lengths of the predetermined number of rays, the normalized ray length histogram module 126 is further configured to combine the normalized ray lengths to form the normalized ray length histogram, as shown in FIG. 3. In certain embodiments, instead of originating rays from the vehicle, the normalized ray length histogram module 126 is configured to form a normalized ray length histogram for each patch in the normalized height map.

The intersection recognition module 128 is configured to, upon receiving the normalized ray length histogram for each patch in the height map, recognize the intersection corresponding to the pixel based on the normalized ray length histogram, and send the recognized intersection to the controller 130. As shown in FIG. 3, whenever there is a normalized ray length of 1 (neighbored by normalized ray lengths of less than 1) or a few neighboring normalized ray length of 1 (neighbored by normalized ray lengths of less than 1), the one or the few normalized ray lengths is counted as a continuous normalized ray length of 1. The intersection recognition module 128 determines that it is an intersection if the number of continuous normalized ray lengths (bin) with value 1 is more than 2. In certain embodiments, the intersection recognition module 128 is further configured to determine that it is a three way intersection or a T-intersection if the number of continuous normalized ray lengths (bin) is three, and it is a four way intersection or a crossroad if the number of continuous normalized ray lengths (bin) is four. On the contrary, it is an open road if the number of continuous normalized ray lengths (bin) is two or one. As shown in FIG. 3, there is a first continuous normalized ray length of 1 containing the 90 degree ray and the 112.5 degree ray, a second continuous normalized ray length of 1 containing the 180 degree ray, and a third continuous normalized ray length of 1 containing the 292.5 degree ray, the 315 degree ray, and the 337.5 degree ray. Once the intersections are determined for each patch in the normalized height map, the intersection recognition module 128 is then configured to perform voting for the pixel/patches, and the type of intersection having the most vote is determined to be the correct intersection. For example, if the normalized height map has 180,000 pixels, and the intersection recognition module 128 determines that there is a crossroad based on 30,000 of the pixels, determines that there is a T-intersection based on 90,000 pixels, and determines that there is an open road based on 60,000 pixels, then the intersection recognition module 128 would determines that there is a T-intersection.

The controller 130 is configured to, upon receiving the recognized intersection for a pixel/patch, control the operations of the vehicle based on the result. In certain embodiments, when the intersection is recognized, the planned path of the vehicle would consider the type of intersection, and the path planning would be optimal.

Figure 4A:
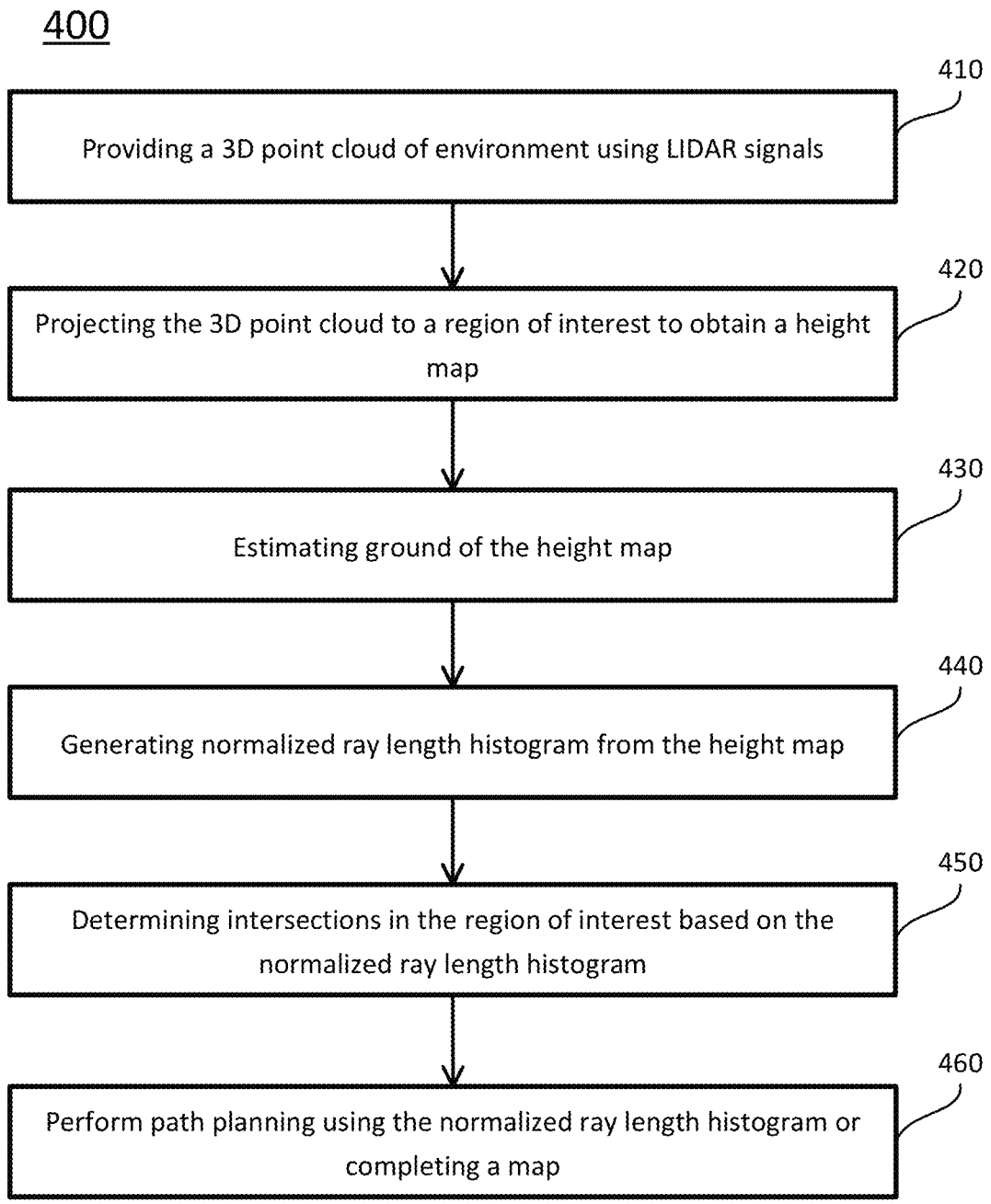
FIG. 4A schematically depicts a method for autonomous navigation according to certain embodiments of the present disclosure.

In certain aspects, the present disclosure relates to a method for autonomous navigation of a vehicle. FIG. 4A schematically depicts a method for autonomous navigation or map completion according to certain embodiments of the present disclosure. In certain embodiments, the method 400 as shown in FIG. 4A may be implemented on a computing device 110 as shown in FIG. 1, where a computing device 110, a LIDAR sensor 150 and IMU/GPS devices 170 are installed on an autonomous vehicle to assist the navigation of the vehicle. It should be particularly noted that, unless otherwise stated in the present disclosure, the steps of the method may be arranged in a different sequential order, and are thus not limited to the sequential order as shown in FIG. 4A.

At procedure 410, the 3D point cloud reconstruction module 120 provides a 3D point cloud of environment, and sends the 3D point cloud to the height map generation module 122. For autonomous path planning, the 3D point cloud is based on LIDAR signals collected by the LIDAR sensor 150 during the driving of the autonomous device, and the LIDAR signals may be processed by SLAM to form the 3D point cloud. The position and orientations of the autonomous device and/or the IMU/GPS devices 170 may be measured by the IMU/GPS devices 170. The 3D point cloud may be generated using the LIDAR signals, the position and orientation of the autonomous vehicle and/or IMU/GPS devices 170, and the installation location of the LIDAR sensor 150 on the autonomous vehicle. For map completion, the 3D point cloud may come with an original map, where the 3D point cloud may be generated in advance using LIDAR signals collected by many vehicles in the map area.

At procedure 420, upon receiving the 3D point cloud from the 3D point cloud reconstruction module 120, the height map generation module 122 projects the 3D point cloud to a region of interest to obtain a height map, and sends the height map to the ground estimation module 124. In certain embodiments, the height map is normalized.

At procedure 430, upon receiving the normalized height map, the ground estimation module 124 estimates accurate ground for the normalized height map, updates the normalized height map based on the accurate ground, and sends the updated normalized height map to the normalized ray length histogram module 126.

At procedure 440, upon receiving the normalized height map with the estimated ground from the ground estimation module 124, the normalized ray length histogram module 126 generates the normalized ray length histogram, and sends the normalized ray length histogram to the intersection recognition module 128.

At procedure 450, upon receiving the normalized ray length histograms from the normalized ray length histogram module 126, the intersection recognition module 128 determines an intersection for the region of interest based on the normalized ray length histograms, and sends the type of intersection for the region of interest to the controller 130.

At procedure 460, upon receiving whether there is an intersection in the region of interest and the type of the intersection, the controller 130 controls the operation of the vehicle, such as recognizing traffic signs around the intersection, making turns, and reducing driving speed, so that the path planning of the vehicle is optimal.

Figure 4B:
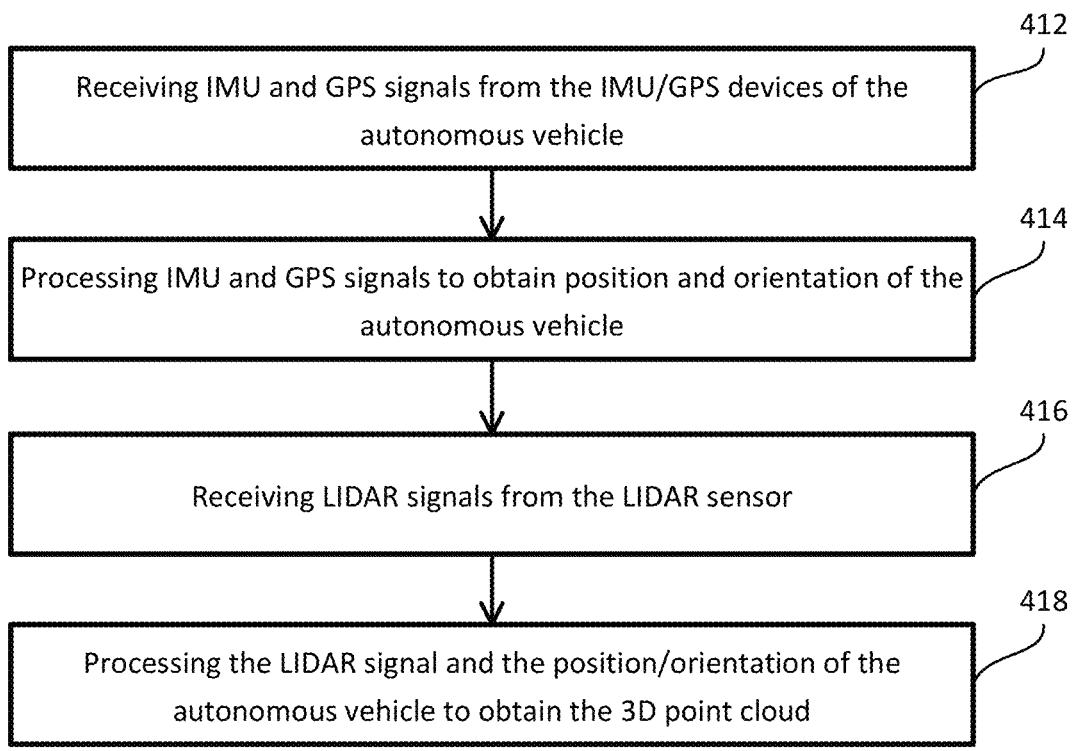
FIG. 4B schematically depicts a method for providing 3D point cloud according to certain embodiments of the present disclosure.

FIG. 4B schematically depicts a method for providing the 3D point cloud according to certain embodiments of the present disclosure. In certain embodiments, the method shown in FIG. 4B corresponds to the procedure 410 in FIG. 4A. Kindly note that for map completion, there is no need to perform the procedures in FIG. 4B, and the 3D point cloud is provided by other applications.

As shown in FIG. 4B, at procedure 412, the 3D point cloud reconstruction module 120 receives IMU and GPS signals from the IMU and GPS devices 170.

At procedure 414, upon receiving the IMU/GPS signals, the 3D point cloud reconstruction module 120 processes the IMU/GPS signal to obtain 3D world coordinates and orientation of the autonomous vehicle and optionally the IMU and GPS devices 170 installed on the autonomous vehicle. In certain embodiments, the GPS signal includes the latitude, longitude, and altitude of the IMU and GPS devices 170, and the IMU signal includes the autonomous vehicle's specific force, angular rate, and orientation. In certain embodiments, the IMU and GPS devices 170 may include separated IMU device and GPS device.

At procedure 416, the 3D point cloud reconstruction module 120 receives LIDAR signal from the LIDAR sensor 150.

At procedure 418, upon receiving the LIDAR signal, the 3D point cloud reconstruction module 120 processes the LIDAR signal and the IMU/GPS signals to reconstruct 3D point cloud of the environment in the 3D world coordinate system, and sends the 3D point cloud in the 3D world coordinate system to the height map generation module 122. In certain embodiments, the height of the environment (3D point cloud) is determined based on the 3D world coordinates of the IMU and GPS devices 170 and the relative location between the LIDAR sensor 150 and the IMU and GPS devices 170. In certain embodiments, the height 0 or the height of the road is defined based on the 3D world coordinate of the IMU and GPS devices 170 and the dimensions of the autonomous vehicle. In certain embodiments, the reconstruction of the 3D point cloud is cumulative, and the computing device 110 updates the reconstructed 3D point cloud after receiving one of a predetermined number of frames of the LIDAR signals. For example, based on the driving speed and the data collection speed of the LIDAR sensor 150, the computing device update the 3D point cloud in an 20 meter interval along the driving direction.

Figure 4C:
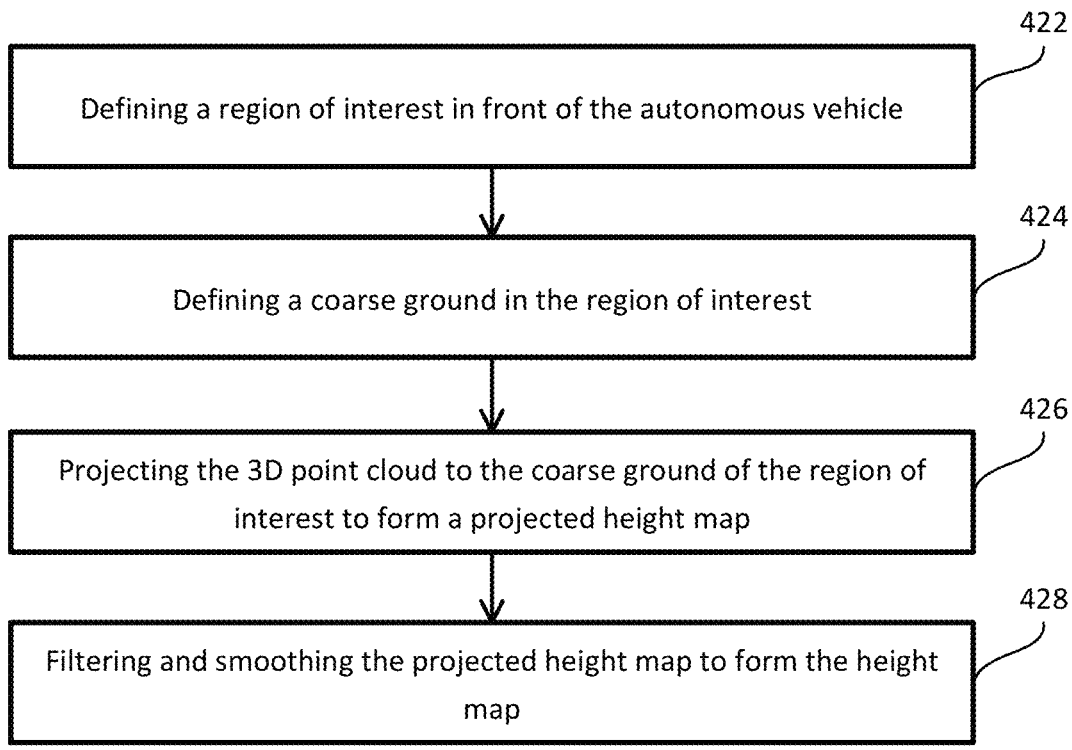
FIG. 4C schematically depicts a method for generating a height map from a 3D point cloud according to certain embodiments of the present disclosure.

FIG. 4C schematically depicts the generation of the height map according to certain embodiments of the present disclosure. In certain embodiments, the method shown in FIG. 4C corresponds to the procedure 420 in FIG. 4A.

As shown in FIG. 4C, at procedure 422, upon receiving the 3D point cloud from the 3D point cloud reconstruction module 120, the height map generation module 122 defines a region of interest. In certain embodiments, the region of interest is in a range of 10-100 meters×4-40 meters. In certain embodiments, the region of interest is a 50 meter×20 meter rectangular area from the current location of the autonomous vehicle, and in front of the current location of the autonomous vehicle. The size of the region of interest is predetermined at least based on the width of the roads in the map. Accordingly, the method 300 can detect the intersection immediately in front of the autonomous vehicle, so as to direct the navigation of the autonomous vehicle based on the detected intersections.

At procedure 424, the height map generation module 122 defines a coarse ground in the region of interest. In certain embodiments, the coarse ground is based on the height of the autonomous vehicle, the height of the LIDAR sensor 150 or the height the IMU and GPS devices 170 on the autonomous vehicle, and the 3D location of the autonomous vehicle, the LIDAR sensor 150, or the IMU and GPS devices 170. In certain embodiments, the coarse ground is defined based on the coordinates of the points in the 3D point cloud, where a large number of points having low height values and substantially similar height values are assumed to be located on the coarse ground. In certain embodiments, when the region of interest is not the first region of interest, the disclosure may use the ground of the previous region of interest as the coarse ground of the current region of interest.

At procedure 426, after defining the coarse ground, the height map generation module 122 projects the points in the 3D point cloud that are directly above the region of interest, onto the region of interest, to form the projected height map. Each pixel of the projected height map may cover a small area of 3 cm×3 cm, and the height value of the pixel is an average height of all the points that are projected to the small area. Accordingly, each pixel of the projected height map has its 3D world coordinates (x, y, z), where z is the average height value corresponding to the pixel. When there is no point from the 3D point cloud that can be projected to the small area, the z value of the pixel corresponding to the small area is set a default height value. In certain embodiments, the default height value is a great value such as 5 meters.

At procedure 428, the height map generation module 122 further filters the projected height map to form a filtered height map, optionally smooth the filtered height map to form a smoothed height map, regards the filtered height map or the smoothed height map as the final height map, and sends the final height map to the ground estimation module 124. In certain embodiments, the filtering is performed by median filter or Gaussian filter.

Figure 4D:
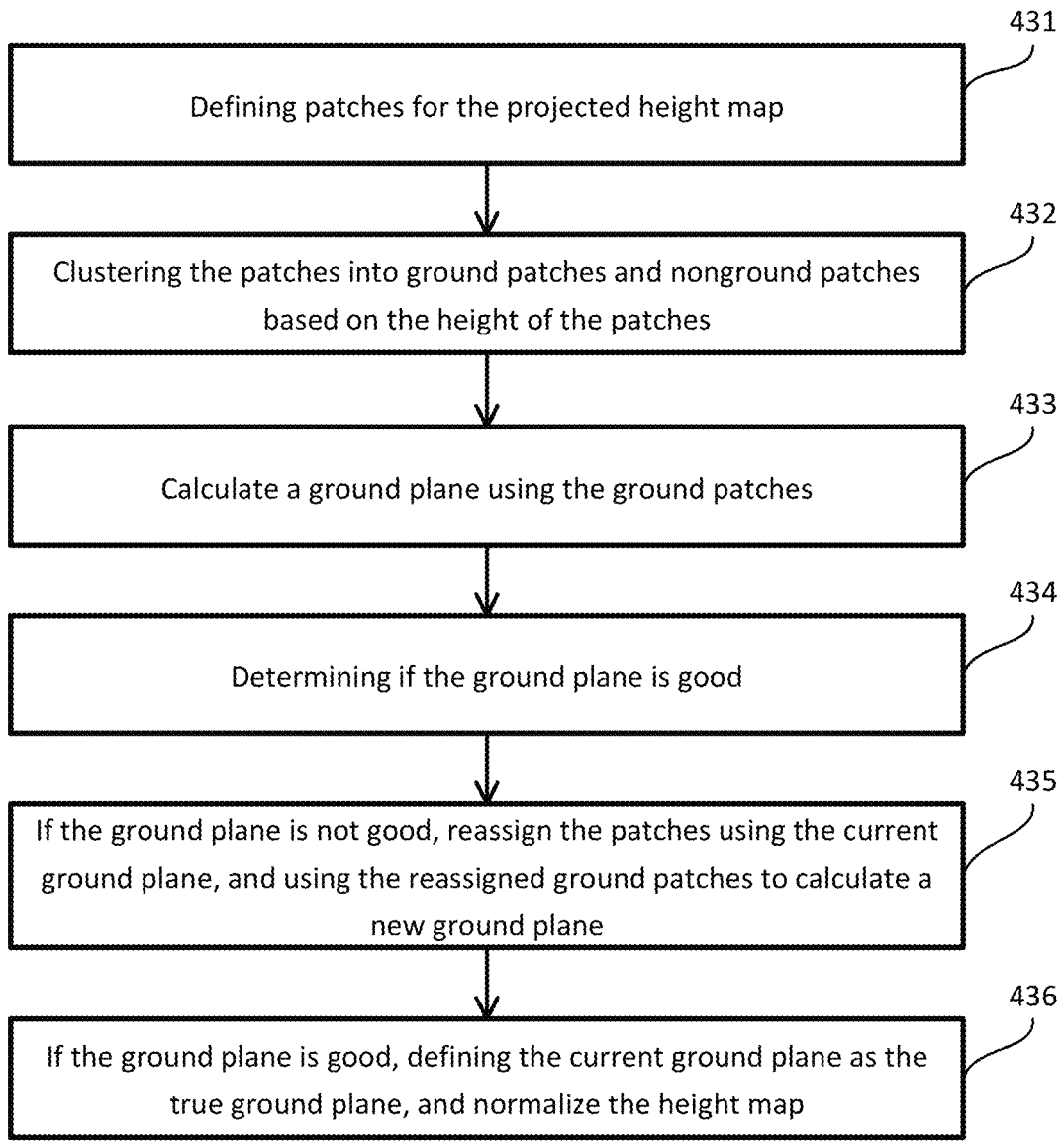
FIG. 4D schematically depicts a method for estimating ground of a height map according to certain embodiments of the present disclosure.

FIG. 4D schematically depicts the estimation of the ground according to certain embodiments of the present disclosure. In certain embodiments, the method shown in FIG. 4D corresponds to the procedure 430 in FIG. 4A.

As shown in FIG. 4D, at procedure 431, upon receiving the height map, the ground estimation module 124 defines patches from the height map, and calculate heights for the patches. Each patch includes, for example, 5×5 pixels. The height of the patch is the average of the heights of the pixels in the patch.

At procedure 432, the ground estimation module 124 clusters the patches into ground patches and nonground patches. In certain embodiments, the patches having a height equals to or is less than a threshold height of the ground are labeled ground patches, and the patches having a height greater than the threshold of the ground are labeled nonground patches. The threshold height of the ground, for example, can be about 30 cm.

At procedure 433, the ground estimation module 124 uses the ground patches to calculate a plane, which may be defined as $ax+by+cz+d=0$, where x, y and z are 3D world coordinates, and a, b, c, and d are parameters.

At procedure 434, the ground estimation module 124 uses certain criteria to determine if the current plane is a good ground plane. The criteria may include at least one of: (1) the value of the fitting error, such as least-square-fit, where a fit error<10 is regarded as a good fit and a fit error>10 is defined as a bad fit, (2) the changes of a, b, c, and d in the current plane and the previous plane, (3) the number of patches changing from ground patches to nonground patches in the plane (relative to the previous plane or the initial ground), and/or (4) the number of patches changing from nonground patches to ground patches.

At procedure 435, if the current plane is not a good ground plane, the ground estimation module 124 reassigns the patches to ground patches and nonground patches based on the current ground plane, and a new ground plane is calculated based on the newly assigned ground patches. The new ground plane can then be determined to be a good ground plane or not.

At procedure 436, if the current plane is a good ground plane, the ground estimation module 124 defines the current plane as the true ground plane, assigns the patches into ground patches and nonground patches, normalizes the heights of the ground patches into the range of 0-255, sets the heights of the nonground patches as 255, and sends the ground plane and the patches (with their coordinates) to the normalized ray length histogram module 126. The ground plane and the patches are also named normalized height map.

Figure 4E:
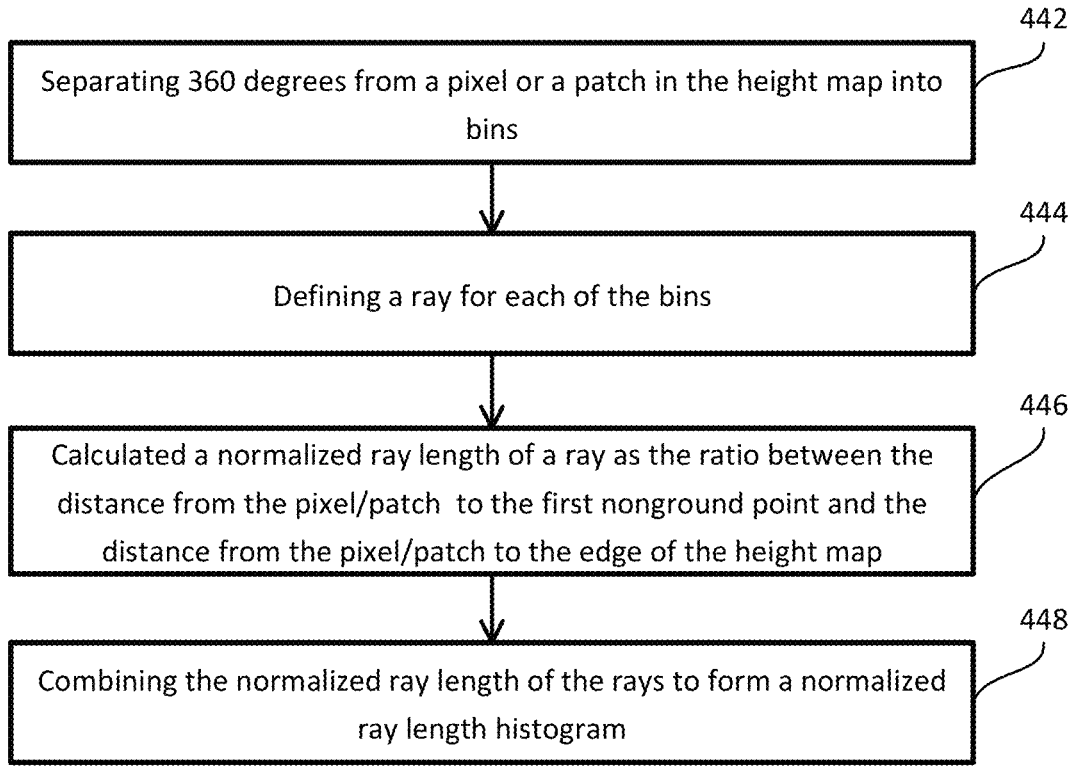
FIG. 4E schematically depicts a method for generating a normalized ray length histogram according to certain embodiments of the present disclosure.

FIG. 4E schematically depicts the generation of the normalized ray length histogram according to certain embodiments of the present disclosure. In certain embodiments, the method shown in FIG. 4E corresponds to the procedure 440 in FIG. 4A.

As shown in FIG. 4E, at procedure 442, upon receiving the normalized height map, the normalized ray length histogram module 126 starts from a patch (or a pixel) in the normalized height map, separates the 360 degrees into 16 bins, and each bin is a circular sector of 22.5 degrees. In certain embodiments, the number of bins can be, for example, 8, 24, 32, 36, etc. according to the environment and the configurations of the hardware. In certain embodiments, the normalized ray length histogram module 126 only perform the function on the ground pixels or ground patches.

At procedure 444, the normalized ray length histogram module 126 determines a ray for each bin. In certain embodiments, each ray is defined to separate the corresponding bin into halves from the center, and the ray goes from the pixel outward.

At procedure 446, when the ray intersects with a ground point (ground pixel or ground patch), the ray continues to go outward, and when the ray intersects with a nonground point, the ray stops, the ray stops. The distance from the start of the ray to the stop of the ray (the nonground point) is measured as $d_s$, the distance from the start of the ray to the edge of the height map is measured as $d_e$, and the normalized ray length histogram module 126 calculates the ratio $d_s/d_e$ and names the ratio as normalized ray length.

At procedure 448, the normalized ray length histogram module 126 combines the normalized ray length of the 16 rays of the pixel or patch to form a normalized ray length histogram for that pixel or patch, and sends the normalized ray length histograms for all the pixels or all the patches of the height map to the intersection recognition module 128. The normalized histogram may be in the form shown in FIG. 3. In certain embodiments, each patch in the normalized height map is defined as a starting point, and thus there are one normalized ray length histogram corresponding to each of the patches of the normalized height map.

Figure 4F:
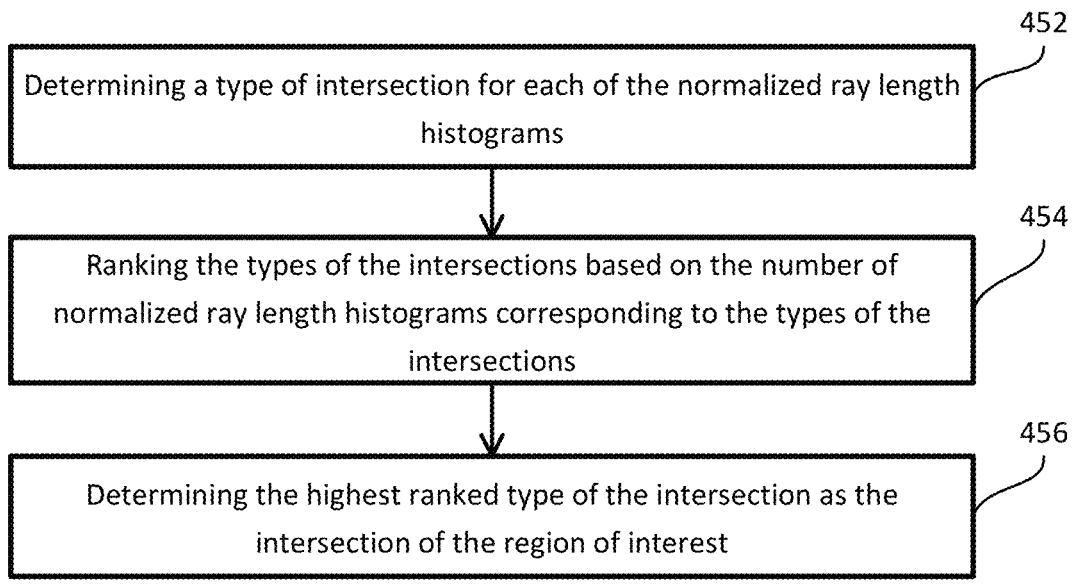
FIG. 4F schematically depicts a method for determining an intersection based on normalized ray length histograms according to certain embodiments of the present disclosure.

FIG. 4F schematically depicts the intersection determination according to certain embodiments of the present disclosure. In certain embodiments, the method shown in FIG. 4F corresponds to the procedure 450 in FIG. 4A.

At procedure 452, upon receiving the normalized ray length histogram for each pixel in the normalized height map, the intersection recognition module 128 determines the type of the intersection based on the normalized ray length histogram. Each patch has a corresponding normalized ray length histogram. For each height map pixel and its ray length histogram, the intersection recognition module 128 determines that the pixel is located in a four-way intersection when the number of continuous normalized ray lengths having a value of 1 is four, a three-way intersection or T-intersection when the number of continuous normalized ray lengths having a value of 1 is three, and an open road when the number of continuous normalized ray lengths having a value of 1 is two or less.

At procedure 454, when the intersections for each pixel in the normalized height map is determined, the intersection recognition module 128 ranks the pixels according to the intersection types. For example, for a height map having 180,000 pixels, there may be 30,000 pixels that have a four way intersection, 90,000 pixels have a three-way intersection, and 60,000 having an open road. Accordingly, the rank is three way intersection>open road>four way intersection.

At procedure 456, after ranking the types of intersections according to the number of pixels having the types of intersections, the intersection recognition module 128 recognizes the type of intersection ranked the highest in the rank as the type of intersection for the region of interest, and sends the determined type of intersection to the controller 130.

In certain aspects the present disclosure relates to a system for completing a map. In certain embodiments, the system includes a computing device, and is provided with a map and LIDAR data collected by cars driving in the mapped area. The computing device is configured to detect intersections based on the LIDAR data, and complete the map by labeling the detected intersections in the map. The method is substantially the same as the method shown in FIGS. 4A-4F, with minor revisions. For example, there is no need to have the LIDAR sensor 150 and the IMU/GPS devices 170, and an original map is provided for the computing device; there is no need to reconstruct the 3D point cloud because the 3D point cloud is available from other means (alternatively, there may be multiple sets of LIDAR signals, and the system may reconstruct the 3D point cloud using the multiple sets of LIDAR signals); the 3D point cloud may cover the whole or most of the areas of the original map and there is no need to collect LIDAR data at real time; the region of interests may be defined along the roads on the original map and there is no vehicle to be referred to; the determined types of intersections are added to the original map as new labels so as to complete the map with sufficient intersection labels.

In a further aspect, the present disclosure is related to a non-transitory computer readable medium storing computer executable code. The code, when executed at a processer 112 of the computing device 110, may perform the methods 400 as described above. In certain embodiments, the non-transitory computer readable medium may include, but not limited to, any physical or virtual storage media. In certain embodiments, the non-transitory computer readable medium may be implemented as the storage device 116 of the computing device 110 as shown in FIG. 1.

In summary, certain embodiments of the present disclosure, among other things, have the following beneficial advantages. First, the disclosure provides a system and method for autonomous navigation, where intersections in the planned path can be determined using LIDAR signals at real-time. Second, 3D point cloud from the LIDAR signals is transformed to height map, each pixel in the height map may correspond multiple 3D points, the transformation of the 3D point cloud to height map and the reducing of the number of 3D points to 2D height map pixels reduce the workload for calculation and make the following intersection determination process fast. Third, patches having multiple height map pixels are used to accurately estimate ground, which further reduces the workload for computing. Accordingly, the function of the computing device is greatly improved at least by reducing the workload for intersection recognition. Further, by converting 3D point cloud to height map and noise removing steps in processing the height map, the intersection recognition result is more reliable.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system for road intersection detection comprising a computing device, wherein the computing device comprises a processor and a storage device storing computer executable code, and the computer executable code, when executed at the processor, is configured to:

provide a three dimensional (3D) point cloud;

generate a two dimensional (2D) height map of the 3D point cloud in a region of interest, wherein each pixel on the 2D height map has a height value corresponding to its height in the 3D point cloud;

estimate whether a 2D pixel in the 2D height map is a ground pixel;

for each ground pixel, draw a plurality of ray lines from the ground pixel toward edges of the 2D height map until the ray lines intersect with a nonground pixel or one of the edges, and calculate a normalized ray length for each of the ray lines, wherein each of the normalized ray lengths is a ratio between a length of each of the ray lines and a length of a corresponding extended ray line, and the corresponding extended ray line is the extension of the ray line until it intersects one of the edges; and recognize a type of intersection of the region of interest based on the normalized ray lengths.

2. The system of claim 1, wherein the computer executable code is configured to recognize the intersection by:

predicting the type of intersection for each of the ground pixels; and determining the type of intersection of the region of interest according to the predicted type of intersections for all the ground pixels, wherein the type of intersection of the region of interest comprises a four way intersection, a three way intersection, and an open road.

3. The system of claim 2, wherein the step of predicting the type of intersection for each of the ground pixels comprises:

forming a histogram comprising all of the normalized ray lengths, wherein horizontal axis of the histogram is angles of the normalized ray lengths, and vertical axis of the histogram is values of the normalized ray lengths;

determining a group of the normalized ray lengths having a value of 1 neighbored by one of the normalized ray lengths less than 1 at both sides; and deciding the type of intersections corresponding to the ground pixel as the four way intersection, the three way intersection or the straight street when a number of groups is four, three and two, respectively.

4. The system of claim 3, wherein the step of determining the type of intersection according to the predicted type of intersections for all the ground pixels comprises:

ranking the types of intersections based on a number of ground pixels predicted to be the types of intersections; and determining the intersection in the region of interest to be the type of intersections that have a top rank.

5. The system of claim 1, wherein the 3D point cloud is constructed using LIDAR signals.

6. The system of claim 5, wherein the 3D point cloud is constructed using SLAM.

7. The system of claim 1, wherein a size of the region of interest is 50 meters×20 meters.

8. The system of claim 1, wherein each pixel in the 2D height map covers a 3 cm-5 cm×3 cm-5 cm area of the regions of interest, and averaged height of points in the 3D point cloud above the area is defined as height of the pixel.

9. The system of claim 1, wherein a height for each of the ground pixel is less than a threshold value in a range of −30 centimeters to 30 centimeters.

10. The system of claim 1, wherein a ground of the 2D height map is determined by:

defining a plurality of patches in the 2D height map, each patch containing a plurality of pixels;

calculating a height for each of the patches as an average height of the pixels in the patch;

clustering the patches having the height equals to or less than 30 cm as ground patches;

calculate a ground plane using the ground patches; and defining the ground plane as the true ground of the 2D height map when the ground patches fits the ground plane.

11. A method for intersection detection, comprising:

providing, by a computing device, e a three dimensional (3D) point cloud;

generating, by the computing device, a two dimensional (2D) height map of the 3D point cloud in a region of interest, wherein each pixel on the 2D height map has a height value corresponding to its height in the 3D point cloud;

estimating, by the computing device, whether a 2D pixel in the 2D height map is a ground pixel;

for each ground pixel: drawing a plurality of ray lines from the ground pixel toward edges of the 2D height map until the ray lines intersect with a nonground pixel or one of the edges, and calculating a normalized ray length for each of the ray lines, wherein each of the normalized ray lengths is a ratio between a length of each of the ray lines and a length of a corresponding extended ray line, and the corresponding extended ray line is the extension of the ray line until it intersects one of the edges; and recognizing, by the computing device, a type of intersection of the region of interest based on the normalized ray lengths.

12. The method of claim 11, wherein the step of recognizing the type of intersection of the region of interest comprises:

predicting the type of intersection for each of the ground pixels; and determining the type of intersection of the region of interest according to the predicted type of intersections for all the ground pixels, wherein the type of intersection of the region of interest comprises a four way intersection, a three way intersection, and an open road.

13. The method of claim 12, wherein the step of predicting the type of intersection for each of the ground pixels comprises:

forming a histogram comprising all of the normalized ray lengths, wherein horizontal axis of the histogram is angles of the normalized ray lengths, and vertical axis of the histogram is values of the normalized ray lengths;

determining a group of the normalized ray lengths having a value of 1 neighbored by one of the normalized ray lengths less than 1 at both sides; and deciding the type of intersections corresponding to the ground pixel as the four way intersection, the three way intersection or the straight street when a number of groups is four, three and two, respectively.

14. The method of claim 13, wherein the step of determining the type of intersection according to the predicted type of intersections for all the ground pixels comprises:

ranking the types of intersections based on a number of ground pixels predicted to be the types of intersections; and determining the intersection in the region of interest to be the type of intersections that have a top rank.

15. The method of claim 11, wherein the 3D point cloud is constructed using LIDAR signals, and the 3D point cloud is constructed using SLAM.

16. The method of claim 11, wherein a size of the region of interest is 50 meters×20 meters, each pixel in the 2D height map covers a 3 cm-5 cm×3 cm-5 cm area of the regions of interest, and averaged height of points in the 3D point cloud above the area is defined as height of the pixel.

17. The method of claim 11, wherein a height for each of the ground pixel is less than a threshold value in a range of −30 cm to 30 cm.

18. The method of claim 11, further comprising determining a ground of the 2D height map by:
    defining a plurality of patches in the 2D height map, each patch containing a plurality of pixels;
    calculating a height for each of the patches as an average height of the pixels in the patch;
    clustering the patches having the height equals to or less than 30 cm as ground patches;
    calculating a ground plane using the ground patches; and
    defining the ground plane as the true ground of the 2D height map when the ground patches fits the ground plane.

19. A non-transitory computer readable medium storing computer executable code, wherein the computer executable code, when executed at a processor of a robotic device, is configured to:

provide a three dimensional (3D) point cloud;

generate a two dimensional (2D) height map of the 3D point cloud in a region of interest, wherein each pixel on the 2D height map has a height value corresponding to its height in the 3D point cloud;

estimate whether a 2D pixel in the 2D height map is a ground pixel;

for each ground pixel, draw a plurality of ray lines from the ground pixel toward edges of the 2D height map until the ray lines intersect with a nonground pixel or one of the edges, and calculate a normalized ray length for each of the ray lines, wherein each of the normalized ray lengths is a ratio between a length of each of the ray lines and a length of a corresponding extended ray line, and the corresponding extended ray line is the extension of the ray line until it intersects one of the edges; and recognize a type of intersection of the region of interest based on the normalized ray lengths.

20. The non-transitory computer readable medium of claim 19, wherein the computer executable code is configured to recognize the intersection by:
    predicting the type of intersection for each of the ground pixels; and
    determining the type of intersection of the region of interest according to the predicted type of intersections for all the ground pixels,
    wherein the type of intersection of the region of interest comprises a four way intersection, a three way intersection, and an open road.

* * * * *